Aug. 7, 1934.     T. V. BUCKWALTER     1,969,500
LOCOMOTIVE ECCENTRIC CRANK AND CRANK PIN CONSTRUCTION
Filed July 3, 1933
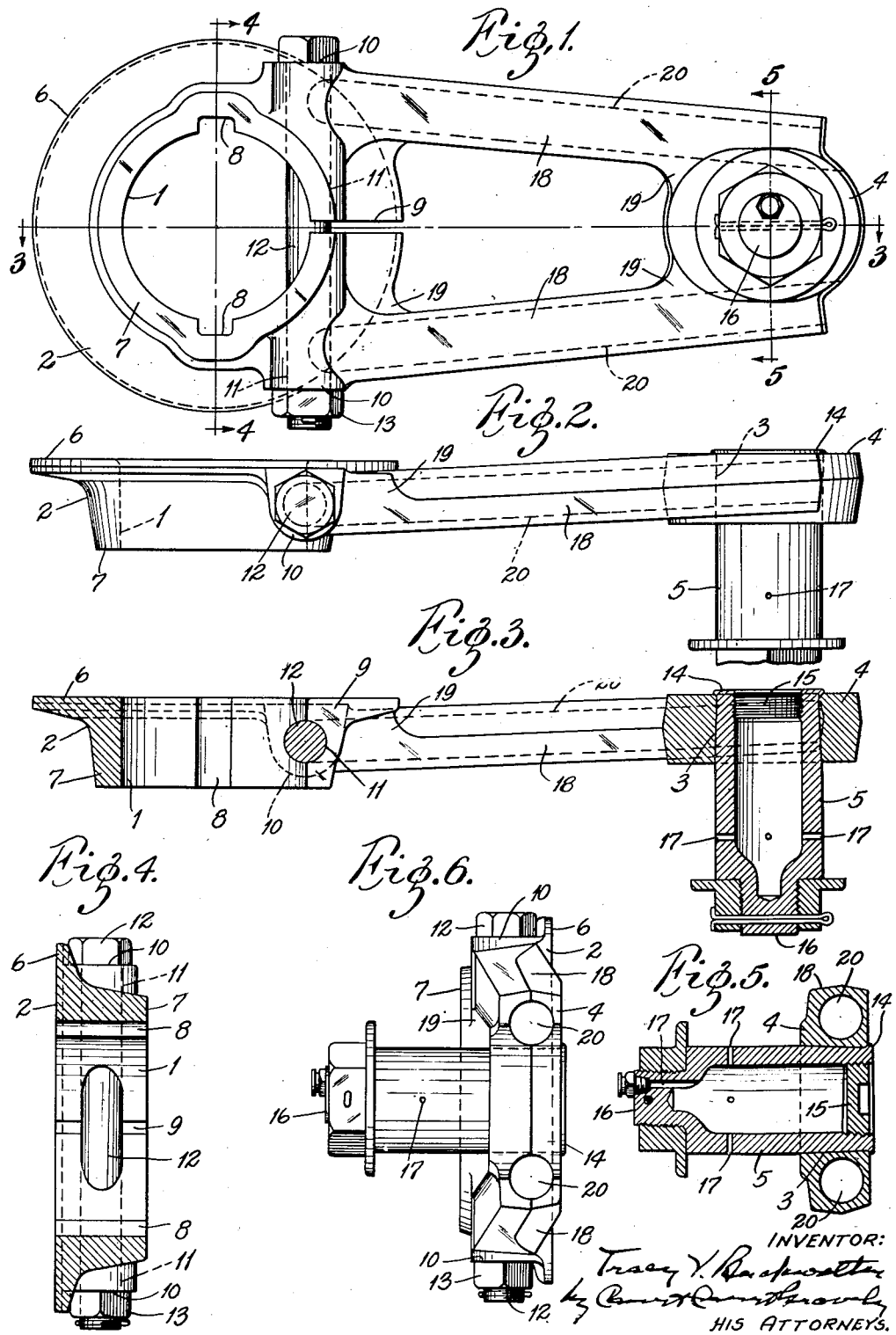
INVENTOR:
Tracy V. Buckwalter
HIS ATTORNEYS.

Patented Aug. 7, 1934

1,969,500

UNITED STATES PATENT OFFICE

1,969,500

LOCOMOTIVE ECCENTRIC CRANK AND CRANK PIN CONSTRUCTION

Tracy V. Buckwalter, Canton, Ohio, assignor to The Timken Roller Bearing Company, Canton, Ohio, a corporation of Ohio Application July 3, 1933, Serial No. 678,767

2 Claims. (Cl. 74—595)

My invention relates to locomotives and has for its principal object to make it practicable to run trains at higher speed than is now practicable. The principal factor which limits the speed of a locomotive is the dynamic augment of the eccentric crank and associated parts, which augment increases rapidly with the speed. The present invention seeks to minimize the dynamic augment by decreasing the weight of the eccentric crank and crank pin and at the same time greatly increasing the strength thereof. The invention consists in the parts and in the arrangements and combinations of parts hereinafter described and claimed.

In the accompanying drawing, wherein like numerals refer to like parts wherever they occur, Fig. 1 is a side elevation of an eccentric crank and crank pin construction embodying my invention, Fig. 2 is a plan view of said construction, Fig. 3 is a central longitudinal section on the line 3—3 in Fig. 1, Fig. 4 is a transverse section on the line 4—4 in Fig. 1, Fig. 5 is a transverse section on the line 5—5 in Fig. 1; and Fig. 6 is an elevation of a crank pin end of an eccentric crank.

My eccentric crank has an eye 1 in its large end 2, by which it is adapted to be mounted on the main crank pin of the locomotive, and an eye 3 in its smaller end 4 in which is mounted the eccentric crank pin 5. The large end is in the form of a wide ring 6 with a longitudinally extending annular flange or hub 7 with longitudinal slots or key-ways 8 formed in the inner surface. A radial slot 9 is cut through the whole width and length of the large end on the side toward the smaller end, said slot extending from the eye 1 to the space between the widely spaced arms 18. Except for this slot, and the usual keyway, the wall of the eye has a continuous circular surface for engaging the main crank pin. Vertical lugs or ribs 10 are provided above and below said slot with flat ends at the top and bottom respectively. A bore or opening 11 for a bolt extends vertically entirely through said lugs. The large end of the crank is mounted on the main crank pin of the locomotive and clamped tightly thereon by means of a bolt 12 extending through said bolt hole and provided with a nut 13. By tightening this nut, the walls of the eye are firmly clamped on the main crank pin with a frictional grip which cooperates with the keys in the key seats to hold the eccentric crank firmly on said main pin.

The smaller end of the eccentric has a circular eye or bore with a slight taper and with a slight counterbore at the narrow end. In this eye is seated an eccentric crank pin 5 whose outer surface has a corresponding taper to fit said bore with its tip 14 projecting beyond the face of the crank. This eccentric crank pin is bored out to form a hollow shell with an internal thread in the tapered end portion thereof. When the hollow pin is pressed into the eye of the crank, its projecting tip 14 is riveted over against the counterbored wall and the outer face of the eccentric crank. Then a threaded tapered plug 15 is screwed in the threaded end of the pin, thereby expanding and forcing the wall of the pin into very tight engagement with the wall of the eye. At the same time, said plug very substantially reinforces the pin and its joint with the eccentric crank.

The body portion of the eccentric crank pin outside of said eccentric crank is of cylindrical shape and adapted to fit an eye in an eccentric rod. The endmost portion 16 of the eccentric crank pin is reduced in diameter and threaded to receive a holding nut. This end portion and the cylindrical wall are both provided with passageways 17 opening into the bore thereof and fitted for lubrication.

The portion of the small end of the eccentric crank surrounding the eye 3 is of generally oval shape, being of greatest radial thickness in the plane passing through the centers of the two eyes and decreasing to the plane perpendicular thereto that passes through the center of the smaller eye. The two end portions of the eccentric crank pin are integrally united by two arms 18 widely spaced apart. At the larger end, the overall distance from the upper side of the upper arm to the lower side of the lower arm is somewhat less than the diameter of the circular portion of said end; but at the smaller end, such distance is considerably more than the vertical diameter of the portion of the crank that encloses the eye, although the arms converge. The angles between the arms and the end portions are rounded out with metal 19 integral therewith.

By reason of the arms being so far apart, it is feasible to dispense entirely with all metal between them. To do so advantageously, however, necessitates the use of an alloy steel with properties far superior to those of ordinary steel. An alloy steel conforming to the following formula is suitable, namely:

| | Percent |
|---|---|
| Carbon | .35 to .45 |
| Nickel | 1.50 to 2.00 |
| Chromium | .60 to .80 |
| Molybdenum | .20 to .30 |
| Manganese | .60 to .80 |
| Iron | Remainder |

The properties of an alloy steel of this composition suitably heat treated and drawn are indicated by a yield point of 120,000 pounds per square inch, an elongation of 20 percent, a reduction of area 55 to 60 percent, Brinell hardness 290 and Izod 70. In consequence of these properties and the design of the eccentric crank above described, the weight thereof is about one-third less than the standard eccentric crank now in service; that is to say, the weight of the eccentric crank above described with its arms solid is about 111 pounds as compared with the weight of 180 pounds of the comparable standard eccentric crank that is made by hammer forging axle steel. As the dynamic augment is a function of the weight, this great saving of weight is of far reaching consequence in making it practical to increase the speed of a locomotive.

In order further to decrease the weight of the eccentric crank the arms may be and preferably are bored out longitudinally, as at 20. In this way, the weight of my eccentric crank above described may be further reduced to about 90 pounds, which is only about half of the weight of the standard eccentric crank that is comparable therewith. My new eccentric crank, even though its arms are hollow, is still much stronger than the standard eccentric crank and better able to take care of the stresses thereon that develop in service.

As is the case of the eccentric crank proper, the eccentric pin is lighter than the standard pin, such decrease in weight being attributable to the use of high grade alloy steel of the proper physical properties to permit the pin to be hollowed out and mounted in the way described. An alloy steel of the following composition is suitable for such pin, namely:

|  | Percent |
|---|---|
| Carbon | .35 to .45 |
| Nickel | 1.50 to 2.00 |
| Chromium | .25 minimum |
| Molybdenum | .20 to .30 |
| Manganese | .50 to .80 |

The physical properties of a steel of this composition suitably heat treated and drawn are indicated by yield point of 130,000 pounds per square inch, elongation of 18 percent, reduction of area 60 percent, Brinnell hardness 340 and Izod 45.

In addition to being much lighter and much stronger than the comparable standard eccentric crank and crank pin construction, my construction has the great advantage of being well adapted to manufacture by drop forging and the even more important advantage of being well adapted to heat treatment, especially when its arms are hollow. The invention is not restricted to alloy steels of the exact compositions stated, as other high grade alloy steels may be used therefor.

What I claim is:

1. A locomotive eccentric crank having a relatively large end portion with an eye therein adapted to receive the main crank pin and a relatively small end portion having an eye therein adapted to receive an eccentric crank pin and spaced upper and lower arms connecting said end portions, the wall of the large end portion being split radially between said arms, said larger end portion having lugs with alined bores on opposite sides of the split adapted to receive a locking bolt, the inner faces of the arms being substantially tangential to the eye in the smaller end.

2. A locomotive eccentric crank having a relatively large end portion with an eye therein adapted to receive the main crank pin and a relatively small end portion having an eye therein adapted to receive an eccentric crank pin and spaced upper and lower arms integrally connecting said end portions, the wall of the larger end portion being split radially between said arms, said larger end portion having lugs with alined bores on opposite sides of the split adapted to receive a locking bolt, the arms being substantially straight and hollow and extending past the vertical diametrical plane of the eye of the smaller end portion.

TRACY V. BUCKWALTER.